United States Patent

[11] 3,530,889

[72] Inventor Lloyd Spencer
220 Patrician Way, Pasadena, California 91105
[21] Appl. No. 829,546
[22] Filed June 2, 1969
Continuation-in-part of Ser. No. 565,336, June 27, 1966, abandoned, which is a division of Ser. No. 359,392, Apr. 13, 1964, now Pat. No. 3,384,121, May 21, 1968, which is a continuation-in-part of Ser. No. 2,523, Jan. 14, 1960, abandoned, and Ser. No. 289,806, June 24, 1963, abandoned
[45] Patented Sept. 29, 1970

[54] MIXING VALVE WITH SECONDARY SHUTOFF
12 Claims, 14 Drawing Figs.
[52] U.S. Cl. ..................................................... 137/624.12,
137/360, 251/289, 137/625.41, 137/636.2
[51] Int. Cl. ..................................................... F16k 11/00,
F16k 19/00
[50] Field of Search ............................................ 137/636.2,
607, 625.41, 624.12, 624.11, 360; 251/289

[56] References Cited
UNITED STATES PATENTS
| 927,706 | 7/1909 | Beardsley | 137/624.12 |
| 2,715,010 | 8/1955 | Reeves | 251/289X |
| 2,792,847 | 5/1957 | Spencer | 137/636.2 |

*Primary Examiner*— Alan Cohan
*Attorney*— Lloyd Spencer

ABSTRACT: A mixing valve having hot and cold valve units movable simultaneously and alternately between open and closed positions by a common control member; the control member being manually operated from its front side by a single handle, and also engageable from its back side to move both units simultaneously from any previous manual adjustment to their closed positions.

Patented Sept. 29, 1970

INVENTOR.
Lloyd Spencer

Patented Sept. 29, 1970

INVENTOR.
Lloyd Spencer 3,530,889

MIXING VALVE WITH SECONDARY SHUTOFF

SUMMARY OF THE INVENTION

The present application is a continuation-in-part of my copending application, Ser. No. 565,336, now abandoned filed June 27, 1966, for Mixing Valve with Auxiliary Control, which application is a division of a then pending application for Mixing Valve, Ser. No. 359,392, filed Apr. 13, 1964, now U.S. Pat. No. 3,384,121, issued May 21, 1968, said patent being a continuation-in-part of applications, Ser. No. 2,523, filed Jan. 14, 1960, and, Ser. No. 289,806, filed June 24, 1963, both now abandoned.

Certain embodiments of the present application are related to my copending application, Ser. No. 814,990, filed Apr. 10, 1969, for Mixing Valve and Replaceable Valve Cartridge Therefor.

The present invention is summarized in the following objects:

First, to provide a mixing valve with a secondary shutoff wherein a single control member is manually movable in two directions to effect movement of two valves in unison or in opposition, or to move either valve separately while simultaneously moving a key element in a guide, the key element being accessible from the back side of the mixing valve through a linkage whereby, irrespective of the position in which the control member may be placed, the linkage and key element may be operated so that either or both valves may be moved to their closed positions.

Second, to provide a mixing valve as indicated in the preceding object in which the linkage may be manually operated or provided with a time delay to effect automatic closure of the valve after a predetermined period.

Third, to provide a mixing valve wherein a plurality of mixing valves, such as may be installed in a gymnasium shower room, may be mechanically linked so that a single manual or electrical shutoff control may close all the valves simultaneously.

SPECIFICATION

Figure 1:
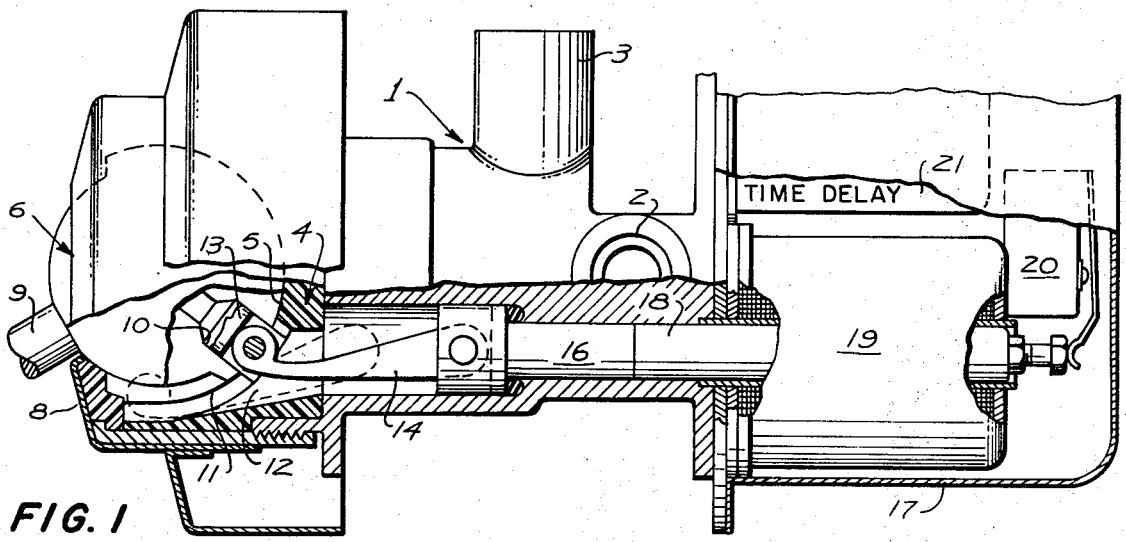
FIG. 1 is a partial side view, partial sectional view of a mixing valve, corresponding to FIG. 19 of my copending application, Ser. No. 565,336, and in U.S. Pat. No. 3,384,121, showing means for connection to a time delay in order that the mixing valve may be shut off after a predetermined interval.
Figure 2:
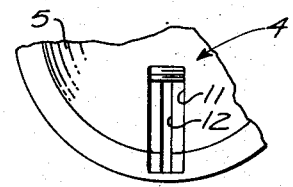
FIG. 2 is a fragmentary front view of the control ball journal socket having means for accommodation of a time delay means.
Figure 3:
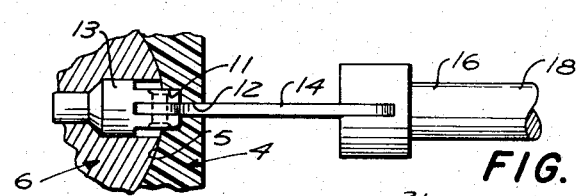
FIG. 3 is a fragmentary sectional view, taken through 3-3 of FIG. 1, showing the control ball and means for attachment to the time delay means.
Figure 5:
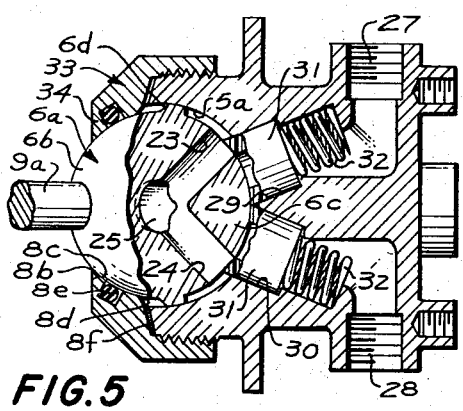
FIG. 5 is a sectional view, showing a modified mixing valve wherein the control ball is provided with passages which communicate with inlet ports, but which incorporates a cam shoulder for limiting movement essentially as shown in connection with the mixing valve shown in FIGS. 1 through 22 of my copending application, Ser. No. 565,336, and in U.S. Pat. No. 3,384,121.
Figure 4:
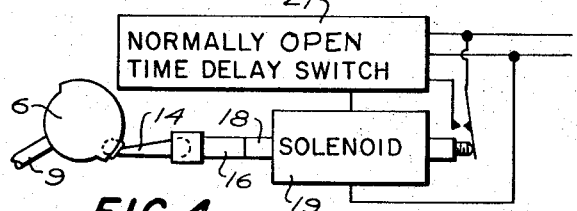
FIG. 4 is an electrical diagram of the time delay means.
Figure 7:
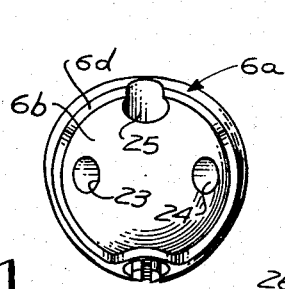
FIG. 7 is a back view of the modified mixing valve.
Figure 8:
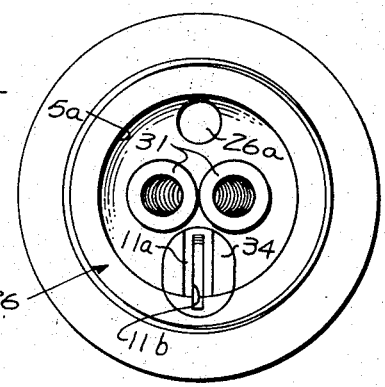
FIG. 8 is a front view of the modified mixing valve with the control ball and retainer cap removed.
Figure 6:
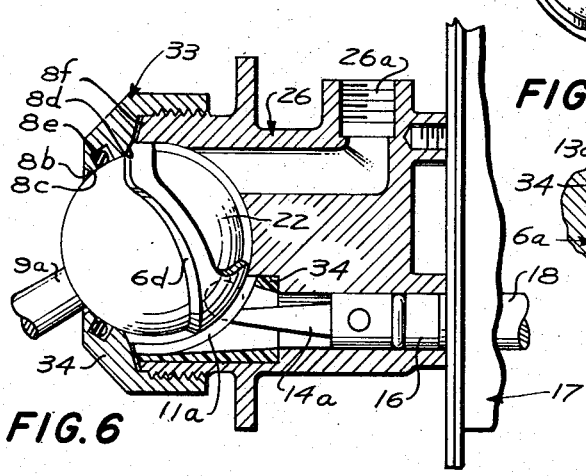
FIG. 6 is a sectional view at right angles to FIG. 5, with a time delay means indicated fragmentarily.
Figure 9:
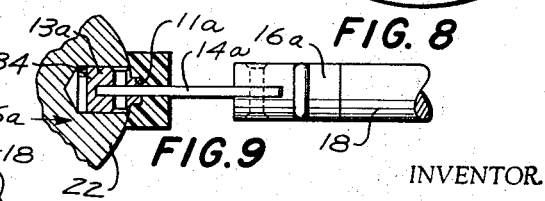
FIG. 9 is a fragmentary sectional view, taken through 9-9 of FIG. 8, showing the control ball and means for connection to the time delay means.
Figure 11:
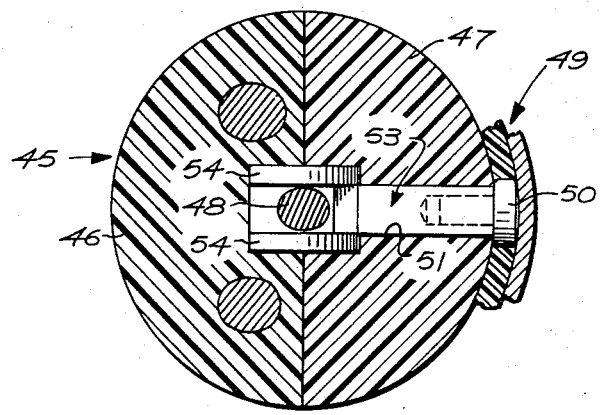
FIG. 11 is a transverse sectional view, taken through 11-11 of FIG. 10.
Figure 12:
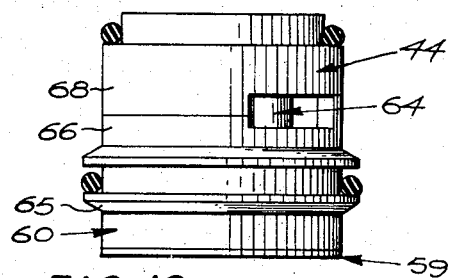
FIG. 12 is a side view of the valve cartridge.

Reference is first directed to FIGS 1 through 4. The mixing valve here illustrated embodies the essential features of the mixing valve shown in FIGS. 1 through 19 of my copending application, Ser. No. 565,336 and also U.S. Pat. No. 3,384,121 to which has been added a means for effecting automatic shut off after a predetermined time delay.

As more particularly set forth in the aforementioned application and patent, the mixing valve includes a body 1, having a pair of inlets 2 for hot and cold water, and an outlet 3. The front end of the valve body 1 is provided with a recess encompassing the valve bores (not shown) communicating with the inlets. A retainer cup 4, having a hemispherical socket 5 is formed in the journal member 4 and receives a cam ball 6, having the cam areas and cam shoulder more fully described in the aforementioned application and patent. The cam ball is held in place by a retainer sleeve 7, provided with an inturned flange 8. A handle 9 extends from the cam ball. The ball 6 is provided with a key pin socket 10 which confronts a key pin slot 11.

To accommodate the time delay, there is provided in the valve body member 1, a bore 1a which is isolated from the water passages therein. The front end of the bore 1a confronts the retainer cup 4 and a slit 12 communicates between the key pin slot or groove 11.

The key pin socket 10 receives a key pin 13, having a slot which journals one end of a link 14 by means of a journal rivet 15. The link 14 extends into the bore and is pivotally connected by a journal rivet to a plunger 16.

Suitably mounted at the rear end of the valve body member 1 is a housing 17 which contains a solenoid armature 18 connected to the plunger 16. The armature is reciprocable within a solenoid 19.

Also within the housing 17 is a switch 20 which is held open when the mixing valve is in its closed position and the armature is in its extreme rearward position. Upon opening of the mixing valve, the switch 20 closes to initiate operation of a conventional time delay unit 21 having a normally open switch adapted to close after a predetermined interval. When the time delay switch closes, the solenoid 19 is energized, causing the armature to return to its initial position and, in doing so, pulls on the plunger 16, link 14 and key pin 13, and draws the cam ball 6 to its off position, as shown in FIG. 1. During the period predetermined by the time delay, the mixing valve may be manually adjusted to any position to provide any desired volume or temperature of water as the solenoid is not activated. Should it be desirable to shut off the mixing valve before operation of the time delay, this may be done without interference by the time delay means.

Reference is now directed to FIGS. 5 through 9. The mixing valve here illustrated differs from the first described mixing valve in that the modified mixing valve includes a control ball 6a which serves both as a cam ball and as a valve ball. The control ball 6a is provided with a hemispherical outer part 6b, an inner hemispherical part 6c and a cam shoulder 6d, but in place of the cam areas provided on the cam ball 6, the inner hemispherical part 6c is provided with a valve area 22 which is contoured spherically and may have the same radius as the outer hemispherical part 6b.

Intersecting the valve area 22 is a hot water port 23 and a cold water port 24 forming radially inwardly converging passages which intersect each other and also intersect a water outlet port 25. The outlet port also intersects the surface of the valve area 22.

A valve body 26 is provided which includes a hot water inlet passage 27 and cold water inlet passage 28. These intersect converging recesses 29 and 30, which in turn intersect a common hemispherical retainer socket 5a which journals the cam and valve ball 6a.

The recesses 29 and 30 receive valve seat members 31 formed of a suitable elastomer and having forward faces which are spherically contoured for sealing engagement with the control ball 6a. Springs 32 urge the seats into sealing contact.

A retainer ring 33 is adapted for screw thread engagement with the forward end of the valve body 26 and is provided with an inturned flange 8a forming an opening 8b, spherical portion 8c and stop shoulder 8d. In addition, the spherical portion 8c is provided with a groove which receives an O-ring 8e for sealing engagement with the outer part 6b of the control ball and a gasket 8f is interposed between the retainer ring and valve body. This outer part is provided with a handle 9a, which is screw threaded or otherwise secured directly to the control ball.

As in the first structure, the control ball 6a is provided with a key pin 13a which rides in a key pin slot or groove 11a formed in the socket 5a disposed in a plane at right angles to a plane common to the recesses 29 and 30. In this case, the key pin slot is formed in a plug 34 set in a recess formed at one side of the recesses 29 and 30.

The control ball 6a moves within the boundaries determined by the cam shoulder 6d in the manner of the control ball 6. Such movement causes the hot and cold water ports to move to and from coincidence with the valve seats 31 for volume selection or for individual selection of hot or cold water.

As in regard to the first described mixing valve, the modified mixing valve may be provided with a time delay means which may be essentially identical, except that a plunger 16a is provided with a sealing O-ring 16b.

While the stop shoulder is shown as formed within the journal means for the control ball, and the cam shoulder is shown on the control ball, it should be noted that the stop shoulder may be provided on the control ball and the cam shoulder within the journal means.

Reference is now directed to FIGS. 10 through 13. The mixing valve here illustrated in part is more particularly disclosed in copending applications, Ser. No. 814,990, filed April 10, 1969 and Ser. No. 814,991, also filed April 10, 1969.

A base member 41 is provided, having a depending portion 42 dimensioned to extend through an aperture provided in the margin of a sink. The base member is provided with a flanged upper end 43 which rests on the margins of the aperture. The base member is provided with hot and cold water inlet passages, as shown and described in the copending application, Ser. No. 814,990.

Mounted on the base member 41 is a replaceable valve unit or cartridge 44, which will be later described. Mounted on the cartridge 44 is a journal ball 45, which includes a bottom component 46 and a top component 47. A single bolt 48 extends downwardly through the journal ball 45 and replaceable valve cartridge 44 and screw threads into the base member 41. Retained on the journal ball 45 is a socket structure 49, shown fragmentarily and more fully described in the above-mentioned copending applications.

The socket structure moves in essentially the same pattern as the cam ball 6 and is provided with a key pin 50. The components of the journal ball are provided with complementary key slots 51 and central journal recesses 52. The key slots serve the same purpose as the key pin slot 11 of the valve shown in FIG. 1. Received in the slots is a lever arm 53, having a yoke at its inner end straddling the bolt 48 and journals 54 which fit the recesses 52.

Figures 10, 13, 14:
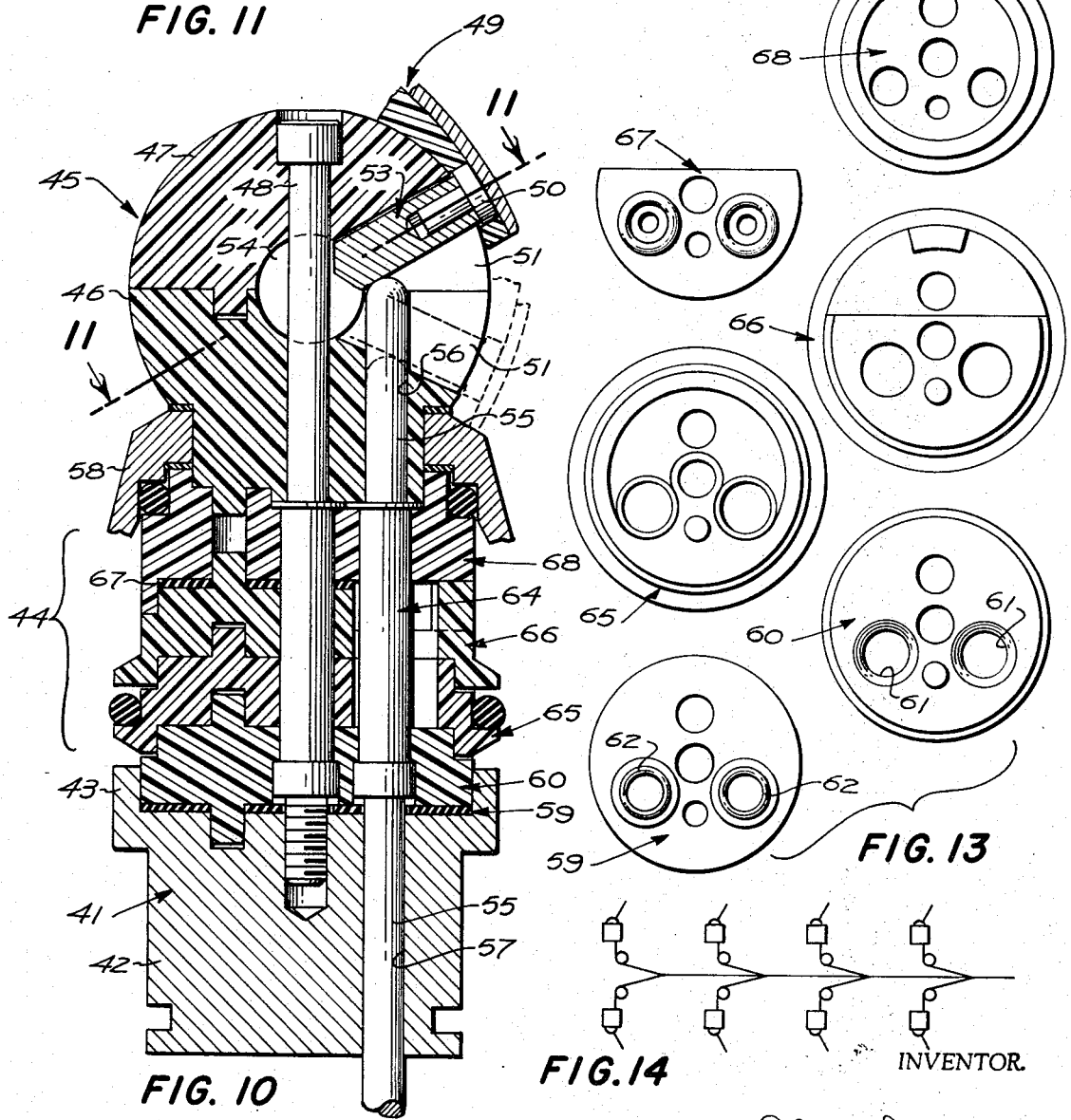
FIG. 10 is a longitudinal sectional view, showing a modified form of the secondary shut off adapted to the mixing valve disclosed in my copending application, Ser. No. 814,990.
FIG. 13 is an exploded view of the principal parts of the valve cartridge, the parts being shown in plan.
FIG. 14 is a diagrammatical view, indicating the manner in which several mixing valves may be shut off simultaneously.

Downward movement of the key pin 50, from the solid line position to the dotted line position shown in FIG. 10, serves to shut off a pair of valves, only portions of which are herein illustrated, but which are fully described and shown in the copending application, Ser. No. 814,990. More specifically, as in the case of the valves shown in FIGS. 1 and 6, movement of the key pin 50 will shut off the mixing valve if only the hot or cold valve is open, or if both are open.

The cartridge 44 is a modification of a replaceable cartridge shown in the copending application, Ser. No. 814,990, which has been arranged to accommodate a shut-off rod 55, which extends therethrough. The upper end of the rod 55 extends through a bore 56 in the bottom component 46 of the journal ball 45, and also through a bore 57 in the base member 41.

The replaceable cartridge 44 is encased in a hub structure 58, indicated fragmentarily in FIG. 10 and fully described in the copending application, Ser. No. 814,990.

The replaceable valve cartridge 44 includes a bottom gasket 59 on which is mounted a bottom or valve seat disk 60. The disk 60 is provided with hot and cold water ports 61. The bottom gasket is provided with valve seat sleeves 62 which fit the ports 61.

The bottom disk 60 is provided with a central bore which receives the lower end of a tie sleeve 63, and is also provided with an offset bore which receives a guide sleeve 64 for the shut off rod 55. A valve chamber disk 65 is mounted on the disk 60 and is perforated to accommodate the tie sleeve 63 and guide sleeve 64.

The valve chamber disk 65 is covered with a lower valve guide disk 66, also perforated to accommodate the tie sleeve 63 and guide sleeve 64.

Overlying the lower valve guide disk 66 is a diaphragm gasket 67 which is clamped against the disk 66 by an upper valve guide disk 68. The disk 68 and gasket 67 are perforated to receive the sleeves 63 and 64. As fully shown and described in the copending application, Ser. No. 814,990, the disks and gaskets cooperate with hot and cold water valve means which are operated by cam follower pins 69, indicated in section in FIG. 11. The sleeves 63 and 64 terminate at the upper side of the disk 68 and are flanged. Both sleeves are in sealing engagement with the bottom disk 60 and the top disk 68. This may be accomplished by mechanical pressure exerted by the ends of the sleeves against the disks, or with the aid of suitable sealants.

The shut-off rod 55 may be connected to a solenoid control similar to that shown in FIG. 1, or other time delay control. However, the rod 55 is arranged to be pushed, rather than pulled.

In the case of each of the embodiments illustrated, a manually operated switch may be substituted for the time delay. Such a switch may control a group of mixing valves; for example, shower valves in a washroom, as may be required to control a group of persons using the showers. While a master valve would accomplish the same purpose, this would require that each shower valve be manually shut off later. In place of a solenoid valve for each outlet, if simultaneous shutoff is desired, a single control may be mechanically linked to a group of valves as suggested in FIG. 14.

While particular embodiments of this invention have been shown a described, it is not intended to limit the same to the details of the constructions set forth, but instead, the invention embraces such changes, modifications and equivalents of the various parts and their relationships as come within the purview of the appended claims.

I claim:

1. A mixing valve, comprising:
   a. a valve body structure having hot and cold water inlets, an outlet, and having an exposed side and a concealed side;
   b. a pair of valve means for said inlets;
   c. a first control means movable within an essentially triangular area for selecting and mixing flow through said valve means;
   d. a second control means movable in a linear path by said first control means coincidental with operation of said first control means to control flow through said valve means, said second control means being operable to effect movement of said first control means toward its valve closing position;
   e. means at the exposed side of said valve body structure for operating said first control means;
   f. and means at the concealed side of said valve body structure for operating said second control means.

2. A mixing valve, as defined in claim 1, wherein:

a. said first control means includes a ball member journaled about an essentially point center;

b. and said second control means includes a pin carried by said ball member and a guide slot for said pin.

3. A mixing valve, as defined in claim 2, wherein: said valve means are located externally of said ball member.

4. A mixing valve, as defined in claim 2, wherein said valve means are located internally of said ball member.

5. A mixing valve, as defined in claim 1, wherein:

a. said first control means includes a socket member journaled about an essentially point center; and b. said second control member includes a pin carried by said socket member and a guide slot for said pin.

6. A mixing valve, as defined in claim 5, wherein:

a. a fixed ball journals said socket member;

b. a lever is pivotally received in said guide slot and journals said pin; and c. said concealed means includes a rod operatively connected with said lever.

7. A mixing valve, as defined in claim 1, wherein said second control means includes a time delay operable after a predetermined period to effect closure of said valve means, and means for initiating said period activated by initial movement of first control means.

8. A mixing valve, comprising:

a. a valve body structure having hot and cold water inlets and an outlet;

b. an essentially spherical journal means at one end of said valve body structure;

c. a control member of spherical contour journaled by said means for movement about a point center;

d. an exposed handle for said control member;

e. key and track means for limiting said control member to two axes of movement about said center;

f. co-operating means formed by said journal means and said control member, operable to cause said handle and regions at the back side of said control member to describe essentially triangular figures, said regions having cam contours;

g. valve units in said hot and cold water inlets and confronting said regions, said valve units being responsive to movement of said control member for opening and closing said inlets; and h. a link connected to said key element to move said control member toward said valve closing position independently of said handle.

9. A mixing valve, as defined in claim 8, wherein:

a. means is operable to move said link in a direction to close said valve units;

b. a time delay for withholding operation of said means for a predetermined period; and c. means operable by initial movement of said control means for initiating operation of said time delay.

10. A mixing valve, as defined in claim 8, wherein said control member is a ball member.

11. A mixing valve, as defined in claim 8, wherein said control member is a socket member.

12. A mixing valve, comprising:

a. a control member of spherical contour;

b. a valve body structure including a journal means for said control member, said journal means and control member cooperating to limit said control member to movement about a point center;

c. key and track means interconnecting said control member and journal means to limit movement of said control member to two axes of movement about said center;

d. a handle for moving said control member;

e. circular confronting stop shoulders formed by said control member and said journal means, one of said stop shoulders being contoured to form a cam having a plurality of facets and peaks therebetween, whereby, on rolling contact with said stop shoulders, said handle and regions at the side of said control member opposite from said handle, describe essentially polygonal figures, said regions having cam contours;

f. valve units in said body structure confronting said regions and responsive to movement of said control member for opening and closing flow passages therein; and g. a link member connected to said key and extending through said valve body in a direction opposite from said control member, said link member being engageable to move said control member to a position closing said valve units independently of said handle.